(12) United States Patent
Song et al.

(10) Patent No.: US 8,711,455 B2
(45) Date of Patent: Apr. 29, 2014

(54) THREE-DIMENSIONAL HOLOGRAPHIC DISPLAY USING ACTIVE SHUTTER

(75) Inventors: Hoon Song, Yongin-si (KR); Yoon-sun Choi, Yongin-si (KR); Hong-seok Lee, Seongnam-si (KR); Jae-hyeung Park, Suwon-si (KR)

(73) Assignees: Samsung Electronics Co., Ltd., Suwon-si (KR); Chungbuk National University Industry-Academic Cooperation Foundation, Cheongju-si (KR)

( * ) Notice: Subject to any disclaimer, the term of this patent is extended or adjusted under 35 U.S.C. 154(b) by 121 days.

(21) Appl. No.: 13/352,741

(22) Filed: Jan. 18, 2012

(65) Prior Publication Data

US 2012/0188619 A1    Jul. 26, 2012

(30) Foreign Application Priority Data

Jan. 21, 2011    (KR) ................. 10-2011-0006494

(51) Int. Cl.
*G03H 1/00* (2006.01)
*G03H 1/08* (2006.01)
*G03H 1/10* (2006.01)

(52) U.S. Cl.
USPC .................................... 359/13; 359/9; 359/10

(58) Field of Classification Search
USPC ............................................ 359/13
See application file for complete search history.

(56) References Cited

U.S. PATENT DOCUMENTS 5,035,474 A * 7/1991 Moss et al. .............. 359/13
2010/0097671 A1 * 4/2010 Leister ..................... 359/9

* cited by examiner

*Primary Examiner* — Jade R Chwasz
(74) *Attorney, Agent, or Firm* — NSIP Law

(57) ABSTRACT

A three-dimensional holographic image display device and a method using the same are provided. Light corresponding to left and right eye holograms is emitted according to a time division method and divided into a first path and a second path. Active shutters operate substantially in synchronization with the emitted left and right eye holograms to provide images to a user's left and right eyes.

21 Claims, 3 Drawing Sheets

THREE-DIMENSIONAL HOLOGRAPHIC DISPLAY USING ACTIVE SHUTTER

CROSS-REFERENCE TO RELATED APPLICATIONS

This application claims the benefit of Korean Patent Application No. 10-2011-0006494, filed on Jan. 21, 2011, in the Korean Intellectual Property Office, the disclosure of which are incorporated herein in their entirety by reference for all purposes.

BACKGROUND

1. Field

The following description relates to a three-dimensional holographic image display device.

2. Description of the Related Art

Three-dimensional image display devices that provide a more realistic and effective display of an image are desired in various fields, such as medical imaging, games, advertisements, education, and the military. Accordingly, as a method of displaying a three-dimensional image, a holographic method and a stereoscopic method have been studied.

According to a holography method, an interference signal obtained by overlapping a light from an object and a coherent reference light is recorded and reproduced. The holography method provides certain advantages for realizing a three-dimensional image. For example, the holography method has the merit of depth cue, as compared to the stereoscopic method. The stereoscopic method only depends on a binocular depth cue, such as binocular disparity or binocular convergence, but does not provide a monocular depth cue, such as accommodation. A lack of a monocular depth cue may result in disharmony with a depth cue generated by binocular disparity, which may cause visual fatigue of a user. On the other hand, the holography method provides both a binocular depth cue and a monocular depth cue. Accordingly, the holography method may display a three-dimensional image that does not cause substantial visual fatigue, and the holography method may provide a greater sense of a realistic image as compared to the stereoscopic method.

Despite the advantages of the holography method, there are many restrictions in displaying a three-dimensional image according to the holography method. Examples of such restrictions include an insufficient resolution of a spatial light modulator (SLM), a narrow viewing angle, existence of a direct current (DC) term and a conjugate image, an insufficient diffraction efficiency, a relatively large calculation capacity for a computer-generated hologram, and the like. From among these restrictions, an excessively narrow viewing angle is generally recognized as a main restricting factor. Holography generates a three-dimensional image by recording and reproducing a wavefront pattern. In order to display wavefronts of an object in a relatively wide angle, a pixel having a size corresponding to a size of wavelength is typically required. However, contemporary SLMs cannot make the wavefronts of an object be displayed at a wide angle, and contemporary SLMs only provide a narrow viewing angle to cover a single eye. Accordingly, other methods, such as a method using a plurality of SLMs or a method using a high speed SLM, have been attempted. However, these methods have typically required a complicated optical system and have generally been regarded as uneconomical.

SUMMARY

In one general aspect, there is provided a three-dimensional holographic image display device that includes a spatial light modulator (SLM) to display holograms for a left and a right eye; a light source to irradiate light for reproducing an image onto the SLM; a reproducing lens unit to reproduce an image by converting light emitted from the hologram displayed on the SLM; a beam dividing unit to divide light incident from the reproducing lens unit so as to proceed along a first path and a second path; a right eye active shutter disposed in a light path between the beam dividing unit and the right eye and substantially synchronized with the SLM to transmit or block light; and a left eye active shutter disposed in a light path between the beam dividing unit and the left eye and substantially synchronized with the SLM to transmit or block light.

The SLM may be a reflective type SLM.

The SLM may include any one selected from the group of a digital micro-mirror display (DMD), a liquid crystal on silicon (LCoS) display, and a liquid crystal display (LCD).

The reproducing lens unit may include a first lens to apply a Fourier transform to light reflected by the hologram displayed on the SLM, a mask for substantially removing light that does not correspond to the image to be reproduced from the light that is Fourier-transformed by the first lens; and a second lens for adjusting a magnification and a viewing angle of the image passed through the mask.

The three-dimensional holographic image display device may further include a first mirror to control a path of light divided by the beam dividing unit that is proceeding along the first path to be directed to the left eye; and a second mirror to control a path of light divided by the beam dividing unit that is proceeding along the second path to be directed to the right eye.

The holograms for the left and right eye may be computer-generated holograms (CGHs)

The beam dividing unit may include a half mirror.

Opening and closing of each of the left and right eye active shutters may be mechanically controlled.

The left and right eye active shutters may each include an optical device, wherein a light transmittance of the optical device is controlled according to an electric signal.

The SLM may display the holograms for the left and right eye according to a time division method.

The three-dimensional holographic image display apparatus may be a head mounted display with a substantially fixed position with respect to each of the left and right eye.

In another aspect, there is provided a method of displaying a three-dimensional holography image, the method including displaying holograms for a left and a right eye on a spatial light modulator (SLM) according to a time division method; irradiating light for reproducing an image onto the SLM; reproducing an image by converting light emitted from the hologram displayed on the SLM; dividing a path of the converted light into a first path and a second path; and controlling a shutter to regulate transmitting and blocking of light directed to the left and right eye substantially in synchronization with the holograms displayed on the SLM according to the time division method.

The SLM may be a reflective type SLM.

The reproducing of the image may include applying a Fourier transform to light reflected by the hologram displayed on the SLM; substantially removing light that does not correspond to the image to be reproduced from the Fourier-transformed light; and adjusting a magnification and a viewing angle of the image.

The path of the converted light may be divided into the first path and the second path by a half mirror.

The method may further include adjusting the divided first and second paths to be paths respectively directed to the left and right eye prior to the controlling of the shutter.

In yet another aspect, there is provided a three-dimensional holographic image display device including a light source; a modulator to display a plurality of holographic images by emitting light irradiated from the light source; a beam splitter to divide the light emitted from the modulator into a plurality of directions; a control unit to transmit data regarding the plurality of holographic images to the modular, to control a left eye active shutter to transmit or block incident light from the beam splitter, and to control a right eye active shutter to transmit or block incident light from the beam splitter.

When a hologram for a left eye is displayed on the SLM, the left eye active shutter may be controlled to be in an open state to transmit light, and the right eye active shutter may be controlled to be in a closed state to block light.

When a hologram for a right eye is displayed on the SLM, the left eye active shutter may be controlled to be in an closed state to block light, and the right eye active shutter may be controlled to be in a open state to transmit light.

The control unit may transmit the data regarding to plurality of holographic images to the modular according to a time division method.

Figure 1:
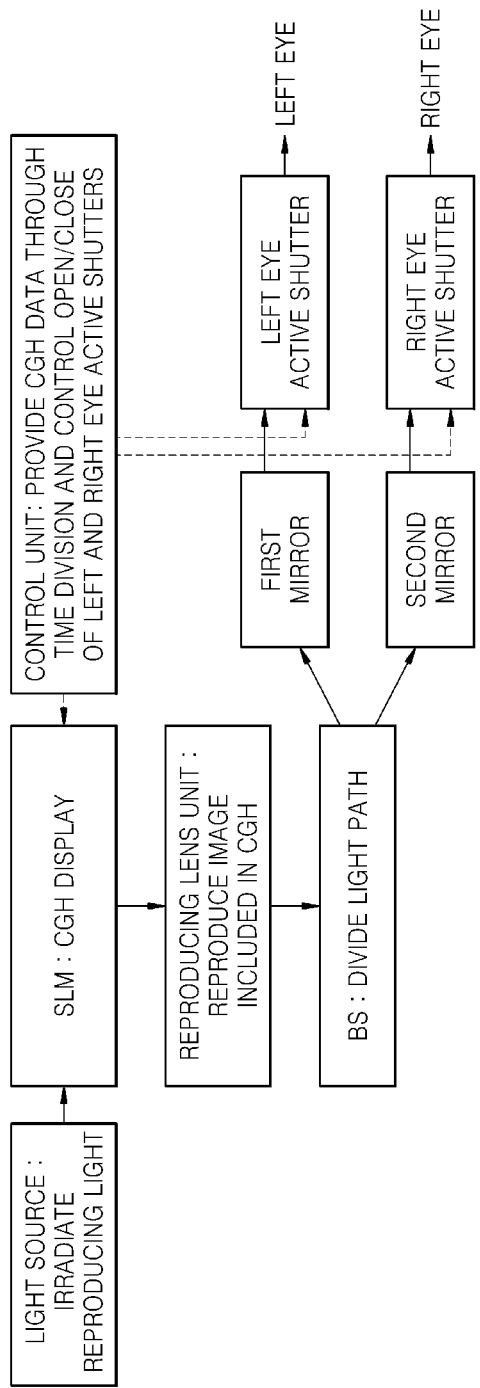
FIG. 1 is a schematic block diagram illustrating an example of a three-dimensional holographic image display device and operations associated with the three-dimensional holographic device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a three-dimensional holographic image display device and operations associated with the three-dimensional holographic device. The method of displaying a three-dimensional holography image according to the example described below uses a hologram method together with a conventional stereoscopic method, in order to substantially prevent visual fatigue due to a lack of a monocular depth cue in the conventional stereoscopic method, which only uses a binocular disparity method. The method of displaying a three-dimensional holography image according to the current example includes: displaying a left eye hologram and a right eye hologram on a spatial light modulator (SLM) according to a time division method; irradiating light for reproducing an image onto the SLM; reproducing the image by converting light emitted from the hologram displayed on the SLM; dividing a path of the converted light into a first path and a second path; and controlling a shutter to regulate transmitting and blocking of light directed to a user's left and right eyes substantially in synchronization with the holograms displayed on the SLM according to the time division method.

The left eye hologram and the right eye hologram are displayed on the SLM. The left and right eye holograms may be formed of, for example, a computer-generated hologram (CGH). Data regarding the CGH is provided to the SLM through time division multiplexing by a control unit.

A light source irradiates reproducing light for reproducing an image included in a hologram displayed on the SLM.

A reproducing lens unit reproduces an image from reproducing light that is diffracted and reflected with respect to the hologram displayed on the SLM.

A beam dividing unit (BS) divides a light path of a reproduced image into a first path and a second path. For example, the first path may be directed to the user's left eye, and the second path may be directed to the user's right eye. The method of displaying a three-dimensional holography image may further include adjusting the first and second paths to be paths directed to the user's left and right eyes, respectively, by first and second mirrors. Opening and closing of a left eye active shutter is controlled to transmit incident light to the user's left eye or to block incident light thereto, and a right eye active shutter is controlled so as to transmit incident light to the user's right eye or to block incident light thereto. The control unit controls opening and closing of the left and right eye active shutters substantially in synchronization with the left and right eye holograms displayed on the SLM.

Figure 2:
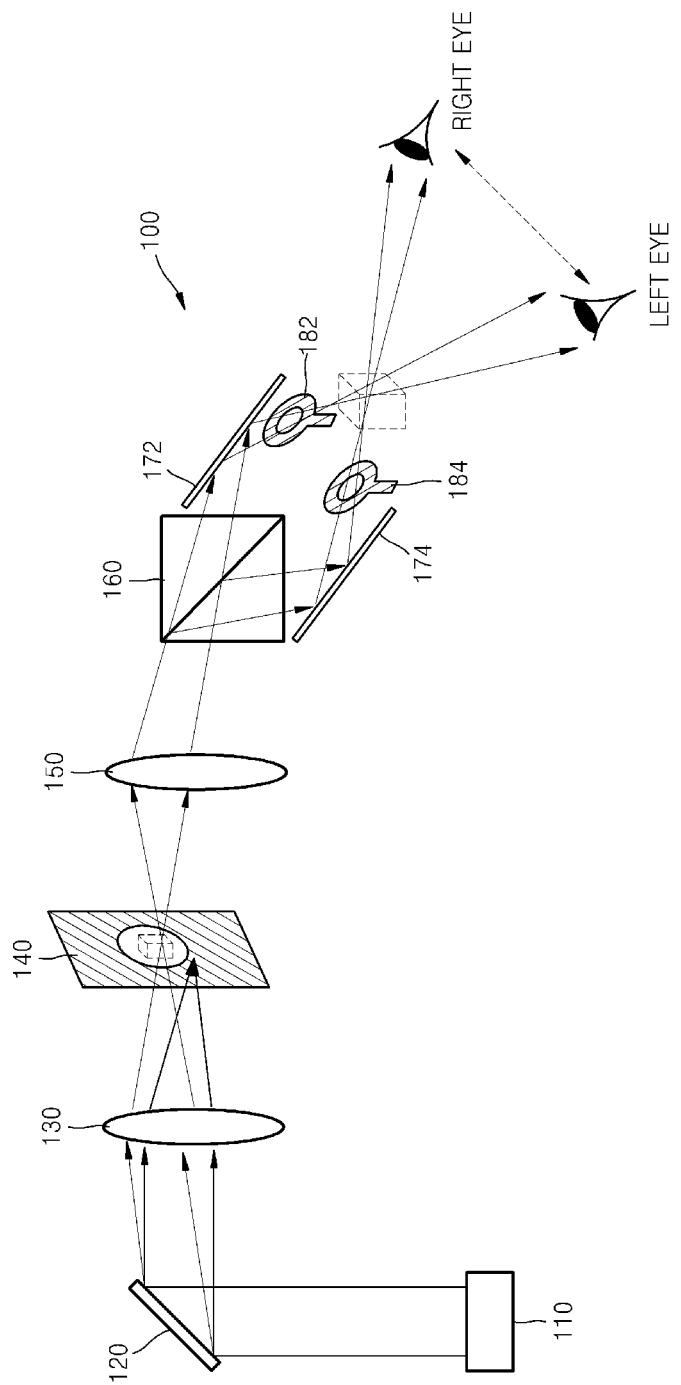
FIG. 2 is a schematic diagram illustrating an example of an optical arrangement of a three-dimensional holographic image display device.

FIG. 2 illustrates an example of an optical arrangement of a three-dimensional holographic image display device 100.

Referring to FIG. 2, the three-dimensional holographic image display device 100 includes an SLM 120 for displaying left and right eye holograms according to a time division multiplexing method, a reproducing light source 110 for irradiating light for reproducing an image onto the SLM 120, a reproducing lens unit for reproducing an image by converting light emitted from the hologram displayed on the SLM 120, a beam dividing unit 160 for dividing light incident from the reproducing lens unit into a first path and a second path, a left eye active shutter 182 that is disposed in a light path between the beam dividing unit 160 and a user's left eye, and a right eye active shutter 184 that is disposed in a light path between the beam dividing unit 160 and the user's right eye. Each of the left eye active shutter 182 and the right eye active shutter 184 are substantially synchronized with the SLM 120 to respectively transmit or block light.

The reproducing light source 110 may be, for example, a coherent laser light source.

A left eye hologram and a right eye hologram are displayed on the SLM 120 according to a time division multiplexing method. The left and right eye holograms displayed on the SLM 120 may be, for example, CGHs. The SLM 120 may be a reflective SLM and may be formed of, for example, a digital micro-mirror display (DMD), a liquid crystal on silicon (LCoS) display, or a liquid crystal display (LCD).

The reproducing lens unit may include a first lens 130 to apply a Fourier transform to light reflected by the displayed hologram, a mask 140 for substantially removing light that does not correspond to an image to be reproduced from the light that is Fourier-transformed by the first lens 130, and a second lens 150 for adjusting a magnification and a viewing angle of an image having passed through the mask 140.

Light incident from the reproducing light source 110 is diffracted and reflected by a pattern of the CGH image displayed on the SLM 120, and thus, the subsequent direction of the light may be controlled. Here, an image that is included in the pattern of the CGH image and is to be displayed may be referred to as an object. Accordingly, the light diffracted and reflected by the SLM 120 passes through the first lens 130 and is Fourier-transformed, and thus, the object is realized as a desired image. However, the realized image may include light of an image that does not correspond to the image to be reproduced, for example, by a DC term or diffraction light of a different order. Accordingly, in order to obtain only the desired image, the mask 140 may be used. The mask 140 substantially removes light other than that of an object that is an image to be reproduced. The second lens 150 adjusts magnification and a viewing angle of the reproduced image.

The beam dividing unit 160 divides a light path into a first path and a second path. The first path may be provided for a user's left eye, and the second path may be provided for the user's right eye. Since images reproduced by the left and right eye holograms displayed on the SLM 120 are left and right eye images, the left and right eye images are dived for parallax formation. The beam dividing unit 160 may include a half mirror, in which half of incident light passes through and the other half is reflected, so that the incident light is divided into the first path and the second path.

The left eye active shutter 182 and the right eye active shutter 184 are respectively disposed in the first light path between the beam dividing unit 160 and the user's left eye and in the second light path between the beam dividing unit 160 and the user's right eye. The left eye active shutter 182 and the right eye active shutter 184 are substantially synchronized with the SLM 120 and are each controlled to transmit or block light. As one example, the left eye active shutter 182 and the right eye active shutter 184 may be mechanically controlled to open and close. As another example, the left eye active shutter 182 and the right eye active shutter 184 may include an optical device of which light transmittance is controlled according to an external signal, for example, liquid crystal (LC) controlled to transmit or block light under electrical control or polymer dispersed liquid crystal (PDLC).

Also, a first mirror 172 may also be disposed between the beam dividing unit 160 and the left eye active shutter 182, and a second mirror 174 may also be disposed between the beam dividing unit 160 and the right eye active shutter 184. The first mirror 172 controls a path of light divided by the beam dividing unit 160 that is proceeding along the first path to be directed to the user's left eye. The second mirror 174 controls a path of light divided by the beam dividing unit 160 that is proceeding along the second path to be directed to the user's right eye.

Figure 3:
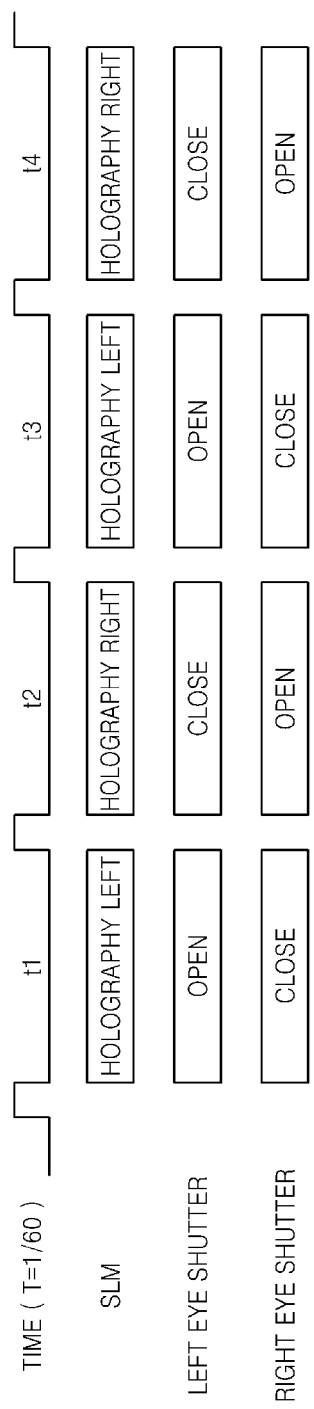
FIG. 3 is a diagram illustrating an example of a method of controlling opening and closing of left and right eye shutters, with regard to displaying left and right eye holograms.

FIG. 3 illustrates an example of a method of controlling opening and closing of left and right eye, with regard to displaying left and right eye holograms. Referring to FIG. 3, when a left eye hologram (Holography Left) is displayed on an SLM (t=t1, t3, . . . ), a left eye shutter is controlled to transmit light (Open), and a right eye shutter is controlled to block light (Close). Similarly, when a right eye hologram (Holography Right) is displayed on an SLM (t=t2, t4, . . . ), the left eye shutter is controlled to block light (Close), and the right eye shutter is controlled to transmit light (Open).

In a three-dimensional holographic image display device, such as three-dimensional holographic display device 100 described above, an image is reproduced through time division with respect to left and right eye holograms in which a user's convergence angle is considered. Accordingly, the left and right eye shutters respectively corresponding to the user's left and right eyes are substantially synchronized with the time division so that opening and closing of the left and right eye shutters is controlled, thereby providing a three-dimensional image without causing substantial visual fatigue.

The three-dimensional holographic image display device 100 may also implemented in a head mounted display (HMD). In this example, certain disadvantages of a conventional binocular disparity method and a conventional hologram method may be more easily compensated, and thus, efficiency of the three-dimensional holographic image display device 100 may be increased. That is, since a hologram image is provided in which a depth cue is considered for each of the user's eyes, the user's visual fatigue may be reduced. Also, since the HMD typically includes a structure in which the positions of both eyes are fixed with respect to the display device, there is little concern for the restriction of a narrow viewing angle which may occur in the conventional hologram method.

The effect of the three-dimensional holographic image display device 100 having the above-described structure has been experimentally confirmed, as described below. In an experiment, a reflective type SLM was used, and a phase-only modulation method was applied to increase diffraction efficiency. A pixel pitch p of the SLM is about 8.1 μm, and, according to Whittaker-Shannon sampling theorem (p=λ/2 sin θ), a viewing angle 2θ of a three-dimensional holography image according to the pixel pitch p is about 4°, which is a sufficient viewing angle to provide coverage for a single eye. Also, the graphic software 3D MAX was used to determine a CGH, and a period T of a time division multiplexing method used in the SLM was about ⅟60 sec. It was confirmed that a monocular depth cue is realized through an image captured by a camera disposed to differentiate a position of a focal plane, and that a binocular depth cue is realized through images respectively captured by cameras disposed at typical positions of both eyes.

In a three-dimensional holographic image display device, such as that described above, a time division display method of left and right eye holograms is used. Thus, unlike a conventional binocular disparity method, since a monocular depth cue is added, the three-dimensional holographic image display device may provide a three-dimensional image without causing substantial visual fatigue.

Also, a three-dimensional holographic image display device, such as that described above, may be implemented in an HMD. In this case, the positions of both eyes of a user are fixed with respect to the display device, and thus, even though each of the left and right eye holograms are provided in a narrow viewing angle suitable for a single eye, an overall sufficient viewing angle may be obtained.

In a three-dimensional holographic image display device and a method using the same, such as that described above, the structure and method in which a depth cue is considered for each of the user's eyes according to a time division multiplexing method is provided as an example. Accordingly, a detailed selection and optical arrangement of components may be modified in other implementations.

It should be understood that the examples described herein should be considered in a descriptive sense only and not for purposes of limitation. Descriptions of features or aspects within each embodiment should typically be considered as available for other similar features or aspects in other embodiments. Further, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional holographic image display device comprising:
   a spatial light modulator (SLM) configured to display holograms for a left and a right eye;
   a reproducing light source configured to irradiate light for reproducing an image onto the SLM;
   a lens unit configured to reproduce an image by converting light emitted from the hologram displayed on the SLM;
   a beam dividing unit configured to divide light incident from the reproducing lens unit so as to proceed along a first path and a second path;
   a right eye active shutter disposed in a light path between the beam dividing unit and the right eye and substantially synchronized with the SLM to transmit or block light; and
   a left eye active shutter disposed in a light path between the beam dividing unit and the left eye and substantially synchronized with the SLM to transmit or block light.

2. The three-dimensional holographic image display device of claim 1, wherein the SLM is a reflective type SLM.

3. The three-dimensional holographic image display device of claim 2, wherein the SLM comprises any one selected from the group consisting of a digital micro-mirror display (DMD), a liquid crystal on silicon (LCoS) display, and a liquid crystal display (LCD).

4. The three-dimensional holographic image display device of claim 2, wherein the reproducing lens unit comprises:
   a first lens to apply a Fourier transform to light reflected by the hologram displayed on the SLM,
   a mask for substantially removing light that does not correspond to the image to be reproduced from the light that is Fourier-transformed by the first lens; and
   a second lens for adjusting a magnification and a viewing angle of the image passed through the mask.

5. The three-dimensional holographic image display device of claim 1, further comprising:
   a first mirror to control a path of light divided by the beam dividing unit that is proceeding along the first path to be directed to the left eye; and
   a second mirror to control a path of light divided by the beam dividing unit that is proceeding along the second path to be directed to the right eye.

6. The three-dimensional holographic image display device of claim 1, wherein the holograms for the left and right eye comprise computer-generated holograms (CGHs).

7. The three-dimensional holographic image display device of claim 1, wherein the beam dividing unit comprises a half mirror.

8. The three-dimensional holographic image display device of claim 1, wherein opening and closing of each of the left and right eye active shutters are mechanically controlled.

9. The three-dimensional holographic image display device of claim 1, wherein the left and right eye active shutters each comprise an optical device, wherein a light transmittance of the optical device is controlled according to an electric signal.

10. The three-dimensional holographic image display apparatus of claim 1, wherein the SLM displays the holograms for the left and right eye according to a time division method.

11. The three-dimensional holographic image display apparatus of claim 1, wherein the apparatus comprises a head mounted display with a substantially fixed position with respect to each of the left and right eye.

12. A method of displaying a three-dimensional holography image, the method comprising:
   displaying holograms for a left and a right eye on a spatial light modulator (SLM) according to a time division method;
   irradiating light for reproducing an image onto the SLM;
   reproducing an image by converting light emitted from the hologram displayed on the SLM;
   dividing a path of the converted light into a first path and a second path; and
   controlling a shutter to regulate transmitting and blocking of light directed to the left and right eye substantially in synchronization with the holograms displayed on the SLM according to the time division method.

13. The method of claim 12, wherein the SLM is a reflective type SLM.

14. The method of claim 12, wherein the reproducing of the image comprises:
   applying a Fourier transform to light reflected by the hologram displayed on the SLM;
   substantially removing light that does not correspond to the image to be reproduced from the Fourier-transformed light; and
   adjusting a magnification and a viewing angle of the image.

15. The method of claim 12, wherein the path of the converted light is divided into the first path and the second path by a half mirror.

16. The method of claim 12, further comprising adjusting the divided first and second paths to be paths respectively directed to the left and right eye prior to the controlling of the shutter.

17. A three-dimensional holographic image display device comprising:
   a light source;
   a modulator configured to display a plurality of holographic images by emitting light irradiated from the light source;
   a beam splitter configured to divide the light emitted from the modulator into a plurality of directions;
   a control unit configured to transmit data regarding the plurality of holographic images to the modulator, to control a left eye active shutter to transmit or block incident light from the beam splitter, and to control a right eye active shutter to transmit or block incident light from the beam splitter.

18. The three-dimensional holographic image display apparatus of claim 17, wherein, when a hologram for a left eye is displayed on the SLM:
   the left eye active shutter is controlled to be in an open state to transmit light; and
   the right eye active shutter is controlled to be in a closed state to block light.

19. The three-dimensional holographic image display apparatus of claim 17, wherein, when a hologram for a right eye is displayed on the SLM:
   the left eye active shutter is controlled to be in an closed state to block light; and
   the right eye active shutter is controlled to be in a open state to transmit light.

20. The three-dimensional holographic image display apparatus of claim 17, wherein the control unit transmits the data regarding to plurality of holographic images to the modulator according to a time division method.

21. The three-dimensional holographic image display apparatus of claim 17, wherein the SLM is configured to alternatively display a hologram for a left eye and a hologram for a right eye, wherein
    when a hologram for a left eye is displayed on the SLM:
    the left eye active shutter is controlled to be in an open state to transmit light; and
    the right eye active shutter is controlled to be in a closed state to block light; and wherein
    when a hologram for a right eye is displayed on the SLM:
    the left eye active shutter is controlled to be in an closed state to block light; and
    the right eye active shutter is controlled to be in a open state to transmit light.

\* \* \* \* \*